United States Patent
Ray et al.

(10) Patent No.: US 11,256,317 B2
(45) Date of Patent: Feb. 22, 2022

(54) SYSTEMS AND METHODS FOR SCHEDULING COMPONENT ACTIVATION

(71) Applicant: Facebook Technologies, LLC, Menlo Park, CA (US)

(72) Inventors: Anirban Ray, Santa Clara, CA (US); Shreyas Narendra Basarge, Menlo Park, CA (US); Viswanath Tadigadapa, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 179 days.

(21) Appl. No.: 16/416,066

(22) Filed: May 17, 2019

(65) Prior Publication Data

US 2020/0363861 A1 Nov. 19, 2020

(51) Int. Cl.
*G06F 1/32* (2019.01)
*H04W 52/02* (2009.01)
*G06F 1/3287* (2019.01)

(52) U.S. Cl.
CPC ........ *G06F 1/3287* (2013.01); *H04W 52/028* (2013.01)

(58) Field of Classification Search
CPC .......................... G06F 1/3287; H04W 52/028
See application file for complete search history.

(56) References Cited

U.S. PATENT DOCUMENTS

| | | | | |
|---|---|---|---|---|
| 2013/0054998 A1* | 2/2013 | Wyatt | ................... | G06F 1/3265 713/323 |
| 2014/0099889 A1* | 4/2014 | Seo | ..................... | H04L 63/0492 455/41.1 |
| 2015/0042570 A1* | 2/2015 | Lombardi | ............. | G06F 3/0488 345/173 |
| 2018/0121306 A1* | 5/2018 | Srinivasan | ............ | G06F 1/3228 |
| 2019/0243991 A1* | 8/2019 | Mudulodu | ............ | G06F 9/4418 |
| 2019/0349858 A1* | 11/2019 | Jantzi | ................ | H04W 52/0235 |
| 2019/0369711 A1* | 12/2019 | Wang | .................... | H04L 65/608 |

* cited by examiner

*Primary Examiner* — Jaweed A Abbaszadeh
*Assistant Examiner* — Cheri L Harrington
(74) *Attorney, Agent, or Firm* — Sheppard Mullin Richter & Hampton LLP (57) ABSTRACT

Systems and methods are disclosed for scheduling component activation. A computer-implemented method may include: detecting a first status of a head-mounted device with one or more physical computer processors; after a first time interval since detecting the first status, disabling a Wi-Fi component of the head-mounted device for a second time interval with the one or more physical computer processors; and after the second time interval, activating the Wi-Fi component for a third time interval with the one or more physical computer processors.

20 Claims, 5 Drawing Sheets

SYSTEMS AND METHODS FOR SCHEDULING COMPONENT ACTIVATION

FIELD OF THE DISCLOSURE

The present technology relates to the field of battery optimization. More particularly, the present technology relates to techniques for scheduling component activation and disabling.

BACKGROUND

Augmented reality (AR) systems, virtual reality (VR) systems, and mixed reality (MR) systems may include batteries to power the corresponding system. Often, components of these systems may be activated at all times, even when a user is not using the systems or when the one or more components of the systems are not in use, which negatively affects battery life.

SUMMARY

Embodiments of the present disclosure are directed to systems and methods for scheduling component activation.

In accordance with the technology described herein, a computer-implemented method may include one or more operations. One operation may include detecting a first status of a head-mounted device with one or more physical computer processors. Another operation may include, after a first time interval since detecting the first status, disabling a Wi-Fi component of the head-mounted device for a second time interval with the one or more physical computer processors. Yet another operation may include, after the second time interval, activating the Wi-Fi component for a third time interval with the one or more physical computer processors.

In embodiments, the first status may include one or more of a removed head-mounted device, a turned off display of the head-mounted device, or receipt of a first set of user input.

In embodiments, the first set of user input may include one or more of a user request to put the head-mounted device to sleep, a user request to exit the interactive content, or a user request to turn off the display.

In embodiments, the first time interval may be between about ten minutes and about four hours.

In embodiments, the second time interval may be between about thirty minutes and about twenty-four hours.

In embodiments, the third time interval may include a dynamic range from about one minute to about one hour.

In embodiments, the computer-implemented method may further include, during the second time interval, activating the Wi-Fi component when a second status of the head-mounted device is detected with the one or more physical computer processors.

In embodiments, the second status may include receiving a signal from a user device.

In embodiments, the signal from the user device is a Bluetooth packet requesting access to the Wi-Fi component for one or more activities. The one or more activities may include one or more of a remote installation, a remote wipe, an over-the-air update, or an operating system update.

In embodiments, the Wi-Fi component is activated for a duration of the one or more activities, such that the one or more activities are completed.

In embodiments, the component may be activated for the one or more activities and is inaccessible for other requests.

In embodiments, the computer-implemented method may further include one or more operations. One operation may include activating the component when a third status of the head-mounted device is detected with the one or more physical computer processors. Another operation may include repeating the detecting, the disabling, and the activating with the one or more physical computer processors.

In embodiments, the third status may include one or more of charging the head-mounted device or activating the head-mounted device.

In embodiments, the computer-implemented method may further include one or more operations. One operation may include, during the third time interval, obtaining one or more requests corresponding to the component from a server. Another operation may include processing the one or more requests with the one or more physical computer processors.

In accordance with additional aspects of the present disclosure, a computer-implemented method may include one or more operations. One operation may include detecting a first status of a head-mounted device with one or more physical computer processors. Another operation may include, after a first time interval since detecting the first status, disabling a component of the head-mounted device for a second time interval with the one or more physical computer processors. Yet another operation may include, after the second time interval, activating the component for a third time interval with the one or more physical computer processors.

In embodiments, the component may include one or more of a Wi-Fi component, a RFID component, a Zigbee component, a 2G component, a 3G component, a 4G component, a 5G component, a gyroscope, an accelerometer, a magnetometer, an IR sensor, an inertial sensor, an image sensor, a charge-coupled-device array, a camera, a location sensor, a microphone, a speaker, a display, an LED, or an emitter.

In embodiments, the computer-implemented method may further include activating the component when a second status of the head-mounted device is detected with the one or more physical computer processors.

In accordance with additional aspects of the present disclosure, a system may include one or more physical computer processors and a memory storing instructions that, when executed by the one or more physical computer processors, cause the system to perform a number of operations. One operation may include detecting a first status of a head-mounted device. Another operation may include, after a first time interval since detecting the first status, disabling a component of the head-mounted device for a second time interval. Yet another operation may include, after the second time interval, activating the component for a third time interval.

In embodiments, the component may include one or more of a Wi-Fi component, a RFID component, a Zigbee component, a 2G component, a 3G component, a 4G component, a 5G component, a gyroscope, an accelerometer, a magnetometer, an IR sensor, an inertial sensor, an image sensor, a charge-coupled-device array, a camera, a location sensor, a microphone, a speaker, a display, an LED, or an emitter.

In embodiments, the instructions, when executed by the one or more physical computer processors, further cause the system to perform activating the component when a second status of the head-mounted device is detected.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description, and the examples below are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Head-mounted devices may operate as part of a virtual reality (VR) system, an augmented reality (AR) system, and/or a mixed reality (MR) system. Such devices have become seemingly ubiquitous. One of the problems associated with these devices is limited space to pack a large capacity battery. The various components of the devices that affect battery life may operate anytime the head-mounted device is on, thereby reducing the battery life. The limited battery life may negatively affect user engagement, e.g., if the device turns off while a user is interacting with the device. This disrupts a given interaction by the user and creates a negative user experience.

Embodiments of the presently disclosed technology may include or be implemented in conjunction with an artificial reality system. Artificial reality may be a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

Disclosed are systems and methods for improving battery life by scheduling activated and disabled time intervals for one or more components of a head-mounted device. These components may be disabled and activated based on a schedule. After detecting a first event, or status, the schedule may wait for a first time interval before disabling the components. After the first time interval, the scheduler may disable the components for a second time interval. After the second time interval, the scheduler may activate the components for a third time interval. In some embodiments, the scheduler may repeat this process of disabling the one or more components and then activating the components until the schedule is interrupted by a status. In further embodiments, the duration of the time intervals may change based on one or more parameters. The scheduling may be designed such that the user does not notice when any given component is turned off. The scheduling is designed to optimize battery life and minimize the interruption to the user experience.

Figure 1A:
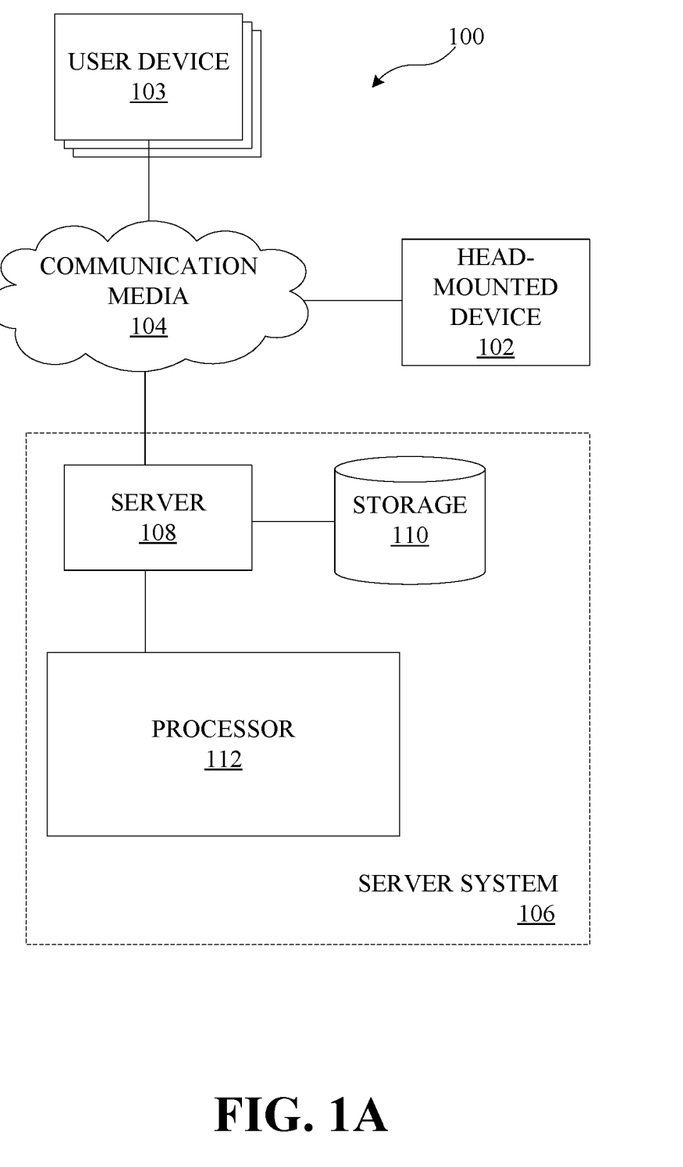
FIG. 1A illustrates an example system, according to an embodiment of the present disclosure.

FIG. 1A illustrates example system 100, according to an embodiment of the present disclosure. System 100 may be used in connection with implementing embodiments of the disclosed systems and methods. By way of example, the various below-described components of FIG. 1A may be used to improve battery life by scheduling time intervals for components of head-mounted device 102 to be disabled.

Figure 1B:
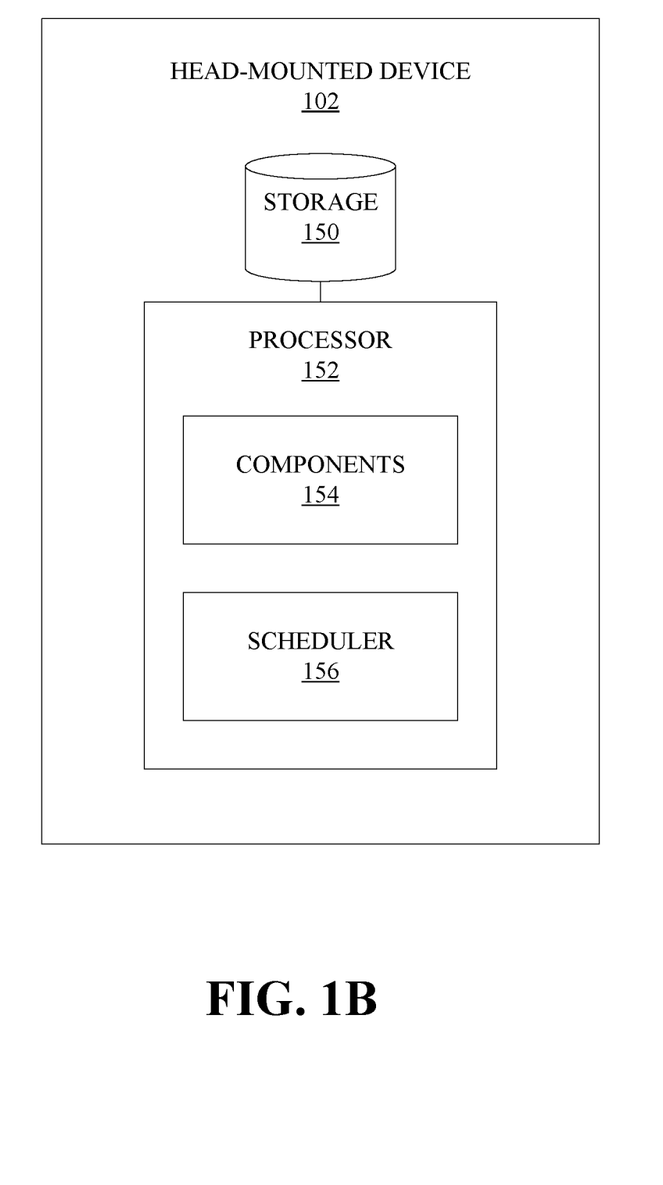
FIG. 1B illustrates an example head-mounted device, according to an embodiment of the present disclosure.

FIG. 1B illustrates example head-mounted device 102, according to an embodiment of the present disclosure. Head-mounted device 102 may include storage 150, processor 152, components 154, and scheduler 156. Processor may include components 154 and scheduler 156. Head-mounted device 102 may be a headset, glasses, visor, lenses, etc. Head-mounted device 102 may be used for AR, VR, MR, and/or other systems. Head-mounted device 102 may include components 154 that affect battery life.

Components 154 may include communication and/or connectivity components (e.g., Wi-Fi components, RFID components, Zigbee components, 2G, 3G, 4G, 5G, etc.), sensors (e.g., gyroscopes, accelerometers, magnetometers, IR sensors, inertial sensors, image sensors, charge-coupled-device arrays, cameras, location sensors, etc.), audio-visual components (e.g., microphones, speakers, displays, LEDs, emitters, etc.), and/or other components. Components 154 may affect a battery (not shown) of head-mounted device 102.

The communication and/or connectivity components may interface with head-mounted device 102 to communication media 104, such that head-mounted device 102 may be communicatively coupled to server system 106 via communication media 104. Communication and/or connectivity components may be able to send/receive information to/from head-mounted device 102. Additionally, communication and/or connectivity components may include additional components for controlling radio and/or wired connections, such as baseband and/or Ethernet modems, audio/video codecs, and so on.

In embodiments, communication and/or connectivity components may utilize Bluetooth®, ZIGBEE, Wi-Fi, GPS, cellular technology, other wireless communication means, or some combination thereof. In some embodiments, communication and/or connectivity components may include low energy communication and/or connectivity components such as a near field communications (NFC) component and/or a Bluetooth® Low Energy (BLE) component. In further embodiments, separate communication and/or connectivity components may be provided for receiving/transmitting high fidelity audio and/or video data. In yet additional embodiments, a wired interface (e.g., micro-USB, HDMI, and/or other wired interfaces) may be used for communicating data between head-mounted device 102 and server system 106.

Storage 150 may include volatile memory (e.g., RAM) and/or non-volatile memory (e.g., flash storage), any of EPROM, EEPROM, cache, or any combination/variation thereof. In various embodiments, storage 150 may store content, metadata, schedules, software, user input, security and encryption information, and/or other data collected by head-mounted device 102. Storage 150 may also be used to store content, metadata, schedules, software, user input, and security and encryption information for head-mounted device 102 for later retrieval and use, e.g., in connection with the generation and/or presentation of content. Additionally, storage 150 may store instructions that, when executed using processor 152, for example, can cause head-mounted device 102 to perform various operations that will be described in further detail herein. It should also be appreciated that storage 150 may be composed of various disaggregated storage elements that may be implemented using various types of storage or memory devices.

In various embodiments, a user may interact with head-mounted device 102 via a user interface, which may include a display for displaying the content. The instructions may be used for presenting content (e.g., videos, pictures, video games, interactive content, apps, etc.) to a user, sending content to other users, allowing a user to interact with other users, allowing a user to interact with the content, requesting content and/or software from a server, requesting content and/or software from a user, and/or other capabilities corresponding to head-mounted device 102, according to various operations described herein.

The instructions may be downloaded, installed, and/or initially configured/setup on head-mounted device 102. For example, head-mounted device 102 may obtain the instructions from server system 106, or from another source accessed via communication media 104, such as an application store or the like. Following installation and setup, the instructions may be used to present content (e.g., videos, pictures, video games, interactive content, apps, etc.) to a user, send content to other users, allow a user to interact with other users, allow a user to interact with the content, request content and/or software from a server, etc. The instructions may also be used to interface with other head-mounted devices 102 and/or user devices 103.

The instructions may include various code/functional components, such as, for example, multiple different time intervals, a schedule, activating the one or more components, disabling the one or more components, etc. These components may be implemented separately or in combination. Each component may be implemented using one or more computer-readable media and that may have computer-executable code stored thereon, such that the code may be operatively coupled to and/or executed by processor 152 to perform specific functions associated with the components (e.g., as described herein with regard to various operations and flow diagrams). Some of these functions, according to embodiments of the disclosure, relate to improving battery life by scheduling activated and disabled time intervals for components 154 and tasks related thereto. The instructions may include a native application modified with a software design kit (e.g., depending on the operating system) in order to carry out the functionalities/features described herein.

Scheduler 156 may include a schedule for disabling components 154. In some embodiments, a first status may trigger a schedule for components 154. The schedule may include consecutive time intervals where one or more components 154 are disabled and activated (e.g., active for a first time interval, disabled for a second time interval, activated for a third time interval, disabled for the second time interval, activated for the third time interval, and so on).

The first status may start a first timer (not shown) of scheduler 156, otherwise track the time, etc. In some embodiments, the first status may include a removed head-mounted device 102, a turned off display of head-mounted device 102, receiving a first set of user input, and/or other statuses.

After the timer has been running for a first time interval, components 154 may be disabled for a second time interval, or a disabled time interval. In embodiments, the first time interval may be re-checked periodically to ensure the first status is still true. In some embodiments, scheduler 156 may start a second timer, reset the first timer, and/or otherwise track the time when components 154 are disabled. In embodiments, the second time interval may be dynamic based on the first status, a day of the week, a time of the week, etc.

After the second time interval, components 154 may be activated for a third time interval, or an activated time interval. Scheduler 156 may start a third timer, reset the first timer, and/or otherwise track the time when components 154 is activated. The third time interval may be dynamic within a range of values based on the one or more requests corresponding to components 154. For example, if requests for components 154 require five minutes of components 154, components 154 may be activated for five minutes. In another example, if there are no requests for components 154, components 154 may be activated for at least one minute. In some embodiments, the duration of the third time interval may be capped. In yet another example, if requests for components 154 exceeds ten minutes, the status of the requests are paused at the end of the ten minutes, such that the download can resume when the one or more components are activated next.

Head-mounted device 102 may present content (e.g., videos, pictures, video games, interactive content, apps, etc.) to a user, send content to other users, allow a user to interact with other users, allow a user to interact with the content, request content and/or software from a server, and/or other capabilities.

In some embodiments, head-mounted device 102 may be put into a low energy power state that conserves battery life even further. For example, if no requests are received for a given number of disabled-activated cycles, a second set of user input is received (e.g., low energy button in graphical user interface is activated, low energy physical button is activated, etc.), then head-mounted device 102 may reduce the number of different components that may be activated. This may further extend battery life. In some embodiments, the disabled time intervals may be further extended and/or the activated time interval may be reduced.

Referring back to FIG. 1A, user device 103 may include a variety of electronic computing devices, such as, for example, a smartphone, tablet, laptop, computer, wearable device, television, virtual reality device, augmented reality device, displays, connected home device, Internet of Things (IOT) device, smart speaker, smart device, and/or other devices.

As shown in FIG. 1A, system 100 may include one or more of head-mounted device 102, user device 103, and server system 106. Head-mounted device 102 and/or user device 103 can be coupled to server system 106 via communication media 104. As is described in detail herein, head-mounted device 102, user device 103, and/or server system 106 may exchange communications signals, including content, metadata, schedules, software, user input, security and encryption information, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases. In some embodiments, communication components communicating via communication media 104 may be disabled on head-mounted device 102 such that server system 106 cannot communicate with head-mounted device 102. In embodiments, server system 106 may queue any requests for head-mounted device 102. The requests may be queued based on a first come, first served basis where earlier requests may be processed before later requests. In some embodiments, requests may be queued based on accomplishing the most requests in an activated time interval. For example, one of the five requests may take the whole activated time interval while four of the five requests could be completed in the same activated time interval. It should be appreciated that other techniques could be used to order and process the one or more requests.

As mentioned above, communication media 104 may be used to connect or communicatively couple head-mounted device 102, user device 103, and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, and processor 112 to one another in addition to other elements of system 100, as well as storage 150, processor 152, components 154, and scheduler 156 of head-mounted device 102. In example implementations, communication media 104 may be or include a wired or wireless wide area network (e.g., cellular, fiber, and/or circuit-switched connection, etc.) for head-mounted device 102, user device 103, and/or server system 106, which may be relatively geographically disparate; and in some cases, aspects of communication media 104 may involve a wired or wireless local area network (e.g., Wi-Fi, Bluetooth®, unlicensed wireless connection, USB, HDMI, standard AV, etc.), which may be used to communicatively couple aspects of system 100 that may be relatively close geographically.

Server system 106 may provide, receive, collect, or monitor information to/from head-mounted device 102 and/or user device 103, such as, for example, content, metadata, schedules, software, user input, security and encryption information, and the like. Server system 106 may be configured to receive or send such information via communication media 104. In some embodiments, the schedules, usage information (i.e., how often head-mounted device 102 is used, how often individual components 154 of head-mounted device 102 are used, etc.), metadata, user input, etc. may be obtained by server system 106 and/or sent from head-mounted device 102 to server system 106 on an opt-in basis. This information may be stored in storage 110 and/or storage 150 and may be processed using processor 112 and/or processor 152. For example, processor 112 and/or processor 152 may include an analytics engine capable of performing analytics, and/or a scheduler engine capable of generating schedules, on information that server system 106 and/or user device 103 has collected, received, etc. from head-mounted device 102. In various embodiments, server 108, storage 110, and/or processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 and/or user device 103 may update information stored on head-mounted device 102. Server 108 and/or user device 103 may send/receive information to/from head-mounted device 102 in real-time or sporadically. Further, server 108 and/or user device 103 may implement cloud computing capabilities for head-mounted device 102. It should be appreciated that system 100 may include multiple head-mounted devices 102, user devices 103, communication media 104, server systems 106, servers 108, storage 110, and/or processors 112.

Figure 2:
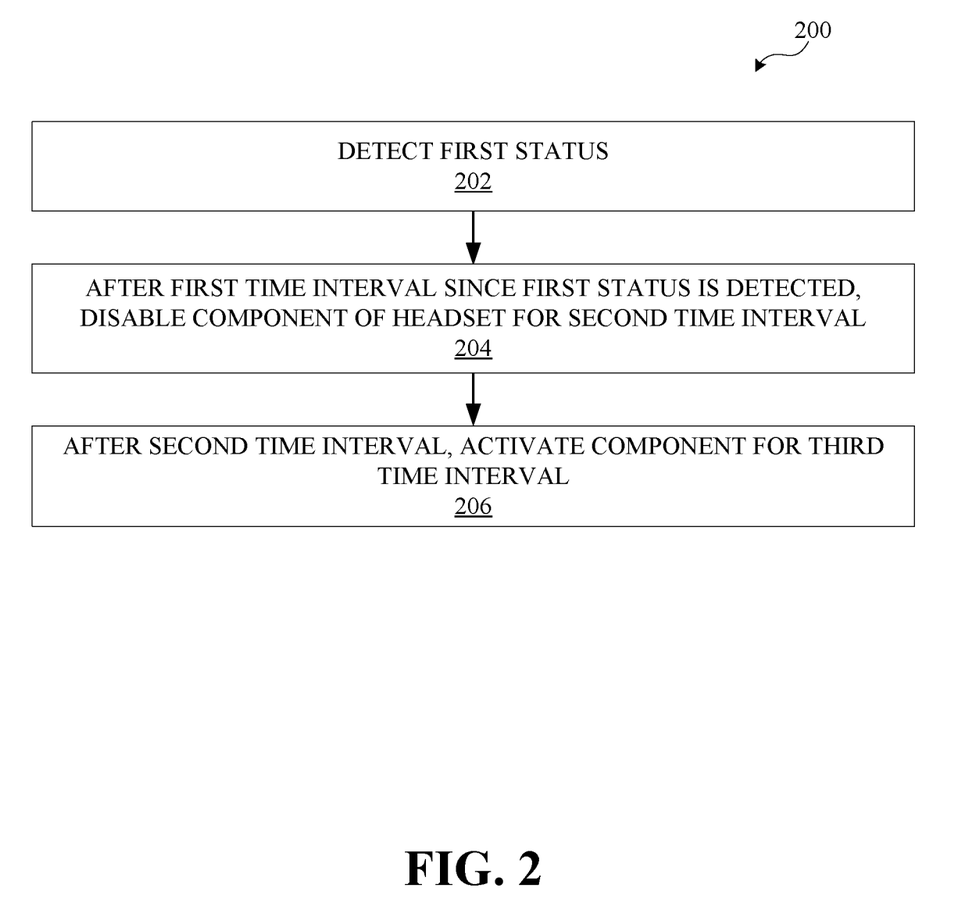
FIG. 2 is an operational flow diagram illustrating an example process for activating and disabling one or more components of a head-mounted device, in accordance with one embodiment.

FIG. 2 is an operational flow diagram 200 illustrating an example process for activating and disabling one or more components of a head-mounted device, in accordance with one embodiment. Operation 202 may include detecting a first status of the head-mounted device. In embodiments, a first timer may be started based upon the initial detection of the first status. In some embodiments, the first status may be periodically re-detected to ensure the first status is occurring. In embodiments, the first status may be re-detected in real-time, about every five minutes, about every ten minutes, about every thirty minutes, etc. It should be appreciated that different durations may be appropriate in different situations.

The first status may be detected based on dropped battery usage, no signal detected from the corresponding component (e.g., display, no gyroscope movement for x minutes, etc.), disabled connection, a signal received by the head-mounted device from the graphical user interface or the physical button, and/or other methods. The first set of user inputs may include a user request to put the head-mounted device to sleep (e.g., via a physical button on the head-mounted device, via a graphical user interface of the head-mounted device, etc.), a user request to exit the interactive content (e.g., via a graphical user interface of the head-mounted device), a user request to turn off the display (e.g., via a physical button on the head-mounted device, via the graphical user interface of the head-mounted device, etc.), and/or other inputs.

As an example to illustrate Operation 202, the turned off display of the head-mounted device may be detected. A timer may start when it is first detected, as described above.

Operation 204 may include, after a first time interval since the first status is detected, disabling the one or more components of the head-mounted device for a second time interval. When the first timer reaches the first time interval, the one or more components may be disabled. In some embodiments, when the one or more components are disabled, a second timer may start, the first timer may restart, and/or the time is otherwise tracked. Disabling the one or more components may include one or more processors shutting off power to the one or more components, disconnecting the one or more components from the main bus, and/or other methods to control the one or more components. The one or more components may be disabled based on an effect on battery (e.g., a first component may have about a forty percent effect on battery and may be disabled, a second component may have a less than about one percent effect on battery and may remain active, etc.), an importance of the component (e.g., Wi-Fi may be more important when the user is not directly interacting with the head-mounted device, whereas sensors may be less important when the user is not directly interacting with the head-mounted device; an importance may be determined based on predicted user experience or based on an average usage of the components based on different statuses), correspondences with other components (e.g., if IR emitters are disabled, the IR sensors may also be disabled), etc.

The first time interval may be about ten minutes, about thirty minutes, about one hour, about two hours, about three hours, about four hours, etc. It should be appreciated that different durations of the first time interval may be appropriate in different situations and that the first time interval may dynamically change based on one or more parameters. For example, detecting a user has removed a head-mounted device may correspond to a first time interval of about two hours, whereas detecting the display of the head-mounted device has turned off may correspond to a first time interval of about one hour because a user removing the head-mounted device is not as certain of a parameter of a long break from user interaction as is a display turning off. The one or more parameters for the first time interval may include multiple statuses occurring in the same period of time, a time of day, a day of the week, etc.

The second time interval may be about thirty minutes, one hour, about two hours, about three hours, about four hours, about six hours, about eight hours, about ten hours, about twelve hours, about twenty-four hours, etc. It should be appreciated that different durations of the disabled time interval may be appropriate in different situations and that the disabled time interval may dynamically change based on one or more parameters. For example, weekdays, from about 9 AM to about 5 PM local time, may have a longer disabled time interval because the user may be working, while weekends may have shorter disabled time intervals because the user may be able to use the head-mounted device more often. The one or more parameters for the second time interval may include a time of day, a day of the week, pre-scheduled releases for new software and/or content, etc.

The one or more components may include communication and/or connectivity components, sensors, audio-visual components, and/or other components, as described herein. It should be appreciated that individual components may have individual schedules. In some embodiments, individual components may follow the same schedule if multiple components correspond to each other (e.g., IR emitters and IR sensors).

Continuing the example above to further illustrate Operation 204, about one hour after a turned off display was detected, the Wi-Fi component, which had been active, may be disabled for about two hours.

Operation 206 may include, after the second time interval, activating the component for a third time interval. The third time interval may be a range of values including about one minute, about two minutes, about three minutes, about four minutes, about five minutes, about six minutes, about seven minutes, about eight minutes, about nine minutes, about ten minutes, about twenty minutes, about thirty minutes, about one hour, etc. The range of values may span from a minimum duration the one or more components are activated to a maximum duration the one or more components are activated. It should be appreciated that different durations of the activated time interval may be appropriate in different situations and that the activated time interval may dynamically change based on one or more parameters. For example, if multiple download requests begin queuing up, and the head-mounted device obtains the multiple download requests that amount to a two hour download time, the activated time interval may increase the maximum duration value until the multiple downloads complete. The one or more parameters for the third time interval may include a time of day, a day of the week, pre-scheduled releases for new software and/or content, a number of requests obtained by the head-mounted device, etc. For example, a new game release or new episode of a television show may be released on a certain date at a certain time. The scheduler may detect the user has purchased the content or otherwise is interested in the content and may activate the Wi-Fi component to complete a download of the new game release or new episode when they are released.

Continuing the example above to further illustrate Operation 206, after two hours of the disabled time interval, the Wi-Fi component may be activated. In one example, the Wi-Fi component may be activated for one minute if no requests are obtained by the head-mounted device. In another example, the Wi-Fi component may be activated for seven minutes because the four requests obtained by the head-mounted device took about seven minutes to download over the Wi-Fi. In yet another example, six equally sized requests obtained by the head-mounted device may require about twenty minutes of Wi-Fi. The Wi-Fi component may be activated for ten minutes and the progress for the six requests may be stored until the next activated time interval. In some embodiments, three of the six requests may be completed and the remaining three may be completed in the next activated time interval.

It should be appreciated that this schedule of a disabled time interval followed by an activated time interval may be repeated indefinitely.

In some embodiments, during the second time interval, the component may be activated when a second status of the head-mounted device is detected. The second status may include receiving a signal from a user device. The signal may be a Bluetooth packet requesting one or more activities. It should be appreciated that other signals may be sent over active components (e.g., RFID, NFC, etc.). The signal may correspond to one or more activities that may include a remote install, a remote wipe, an operating system update, over the air programming, etc. The user device may be within a proximity of the head-mounted device such that the head-mounted device may be able to receive the signal. The signal may trigger activation of the one or more components. In various embodiments, individual signals may trigger individual components. In further embodiments, activating the one or more components based on the second status may not affect the schedule (e.g., disabling the one or more components for the second time interval, activating the one or more components for the third time interval, disabling the one or more components for the second time interval, activating the one or more components for the third time interval, and so on). The one or more components may be activated for the purpose of the one or more activities. In other words, the one or more components may be unavailable, or inaccessible, for other requests.

Continuing the example above to further illustrate an example embodiment, a user may send a signal over the user's cellphone, which is in proximity to the head-mounted device, to the head-mounted device for a remote install. The signal may be sent over an active component of the head-mounted device, such as Bluetooth®. Upon receiving the Bluetooth® signal, the head-mounted device may activate the Wi-Fi component to download the remote install. The Wi-Fi may be otherwise unavailable to other requests. The remote install may activate Wi-Fi for forty minutes to complete the download. In one example, even though the head-mounted device may be activated in the first ten minutes of a disabled time interval, Wi-Fi may remain open until the remote install download is completed. The disabled time interval may be unaffected and may continue for about two hours and may have a ten-minute activated time interval, where the Wi-Fi is activated.

In another example, the head-mounted device may receive the signal at the same time as when the ten minute activated time interval starts. While all requests may be processed with equal priority, once the ten minutes ends, the remote install request may be able to continue downloading, while not affecting the schedule, even if the user's cellphone is outside a proximity of the head-mounted device (e.g., disabling the one or more components for the second time interval, activating the one or more components for the third time interval, disabling the one or more components for the second time interval, activating the one or more components for the third time interval, and so on). It should be appreciated that detecting the second status and activating the one or more components for the one or more activities may not interrupt or reset the schedule.

In embodiments, the component may be activated when the third status of the head-mounted device is detected. The third status may include charging the head-mounted device (i.e., battery life may not be as relevant when the battery is being charged), activating the head-mounted device (e.g., playing a game, interacting with content, etc.), and/or other statuses.

Continuing the example above to further illustrate an example embodiment, the user may plug in the head-mounted device to charge the head-mounted device. Once coupled to the charger, the Wi-Fi component may be activated.

In some embodiments, operations 202-206 may be repeated from FIG. 2 after a third status is detected. In other words, the third status may interrupt, or reset, any of the time intervals, and activate, if in a disabled time interval, the one or more components, such that a first status may need to be re-detected and the one or more components may be disabled after the first time interval passes from the most recent re-detection of the first status.

Continuing the example above to further illustrate an example embodiment, the Wi-Fi component may remain active until the display is turned off again, as described above.

In some embodiments, during the third time interval, one or more requests may be obtained corresponding to the one or more components. When the one or more components are disabled, requests may be queued by a server. For example, the server may queue the requests based on a first come, first served basis, prioritizing operating system updates over software updates over new installs, prioritizing completing the most requests as soon as possible, prioritizing the most resource-intensive requests first, etc.

In one example to further illustrate an example embodiment, multiple application downloads may be queued by a server during a disabled time interval and may be obtained by the head-mounted device when the Wi-Fi component is activated.

In some embodiments, the one or more requests may be processed. The one or more requests may be processed according to the queue. In embodiments, individual requests may be prioritized equally.

Continuing the example above to further illustrate an example embodiment, the multiple application downloads may be downloaded during the activated time interval. As described above, should the multiple application downloads take more than about ten minutes, the duration of the activated time interval, the progress may be paused until the next activated time interval.

Figure 3:
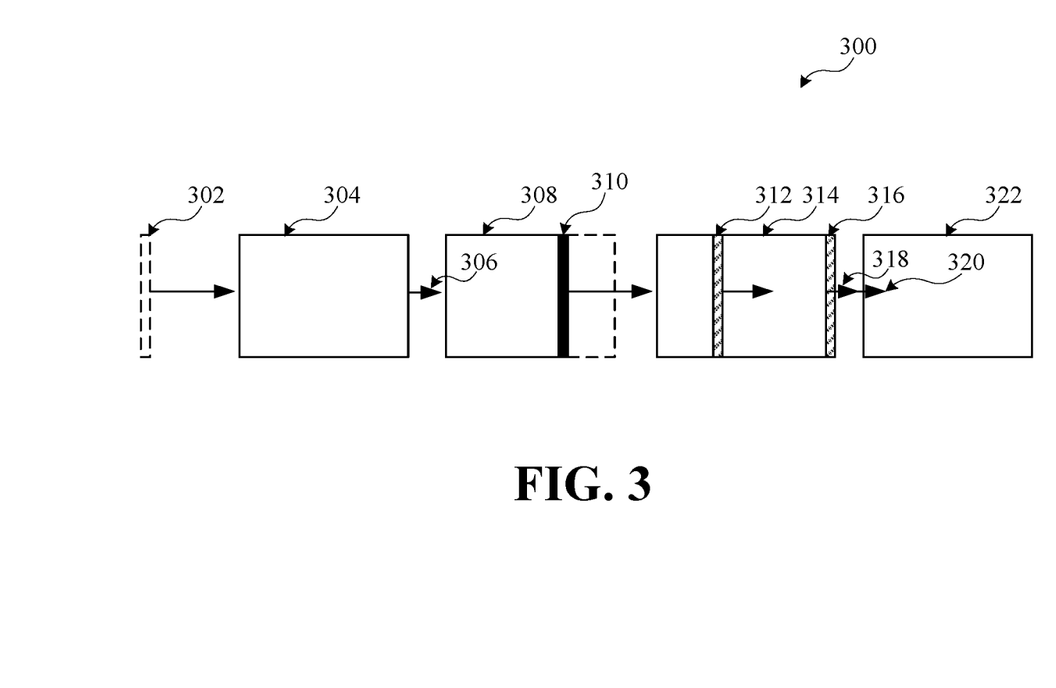
FIG. 3 is an example schedule where the one or more components are disabled and activated, in accordance with one embodiment.

FIG. 3 is an example schedule 300 such that the one or more components are disabled and activated, in accordance with one embodiment. As illustrated, Operation 302 may represent a first status, as described herein, occurring at the head-mounted device. The arrow following Operation 302 may represent the first time interval, as described herein, after which the first status is detected. Operation 304 may represent the second time interval, or the disabled time interval, as described herein. Operation 306 may represent the third time interval, or the activated time interval, as described herein. Operation 308 may represent the disabled time interval. Operation 310 may represent a third status that interrupts the disabled time interval 308. The third status may be immediately followed by a first status. The arrow following Operation 310 may represent the first time interval after which the first status is re-detected. Operation 312 may represent a second status. The second status may be a signal that is not received by the head-mounted device. The arrow following Operation 312 may indicate a duration the one or more activities may be requesting of the one or more components. Operation 314 may represent the disabled time interval. Operation 316 may represent the activated time interval where the one or more activities from Operation 312 is processed along with other requests. Operation 318 may represent the duration of the activated time interval. Operation 320 may represent the extended duration the one or more components is activated to process the one or more activities of Operation 312. Operation 322 may represent the disabled time interval that is unaffected by the extended duration of Operation 320. It should be appreciated that schedule 300 is an example, and other situations could exist where the schedule applies, as described herein.

Figure 4:
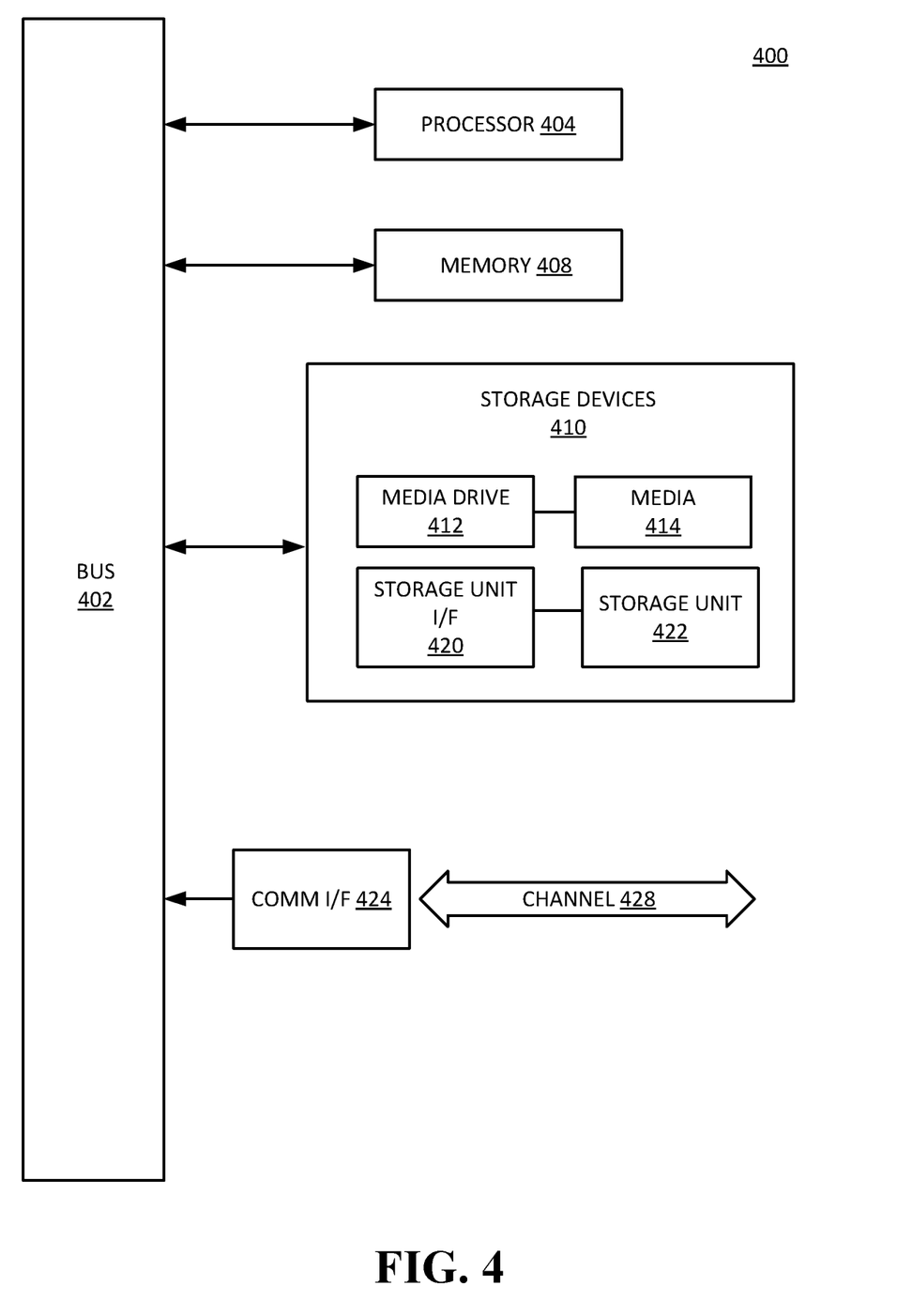
FIG. 4 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the technology using other computing components or architectures.

Referring now to FIG. 4, computing component 400 may represent, for example, computing or processing capabilities found within desktop, laptop, and notebook computers; hand-held computing devices (FDA's, smart phones, cell phones, palmtops, etc.); mainframes, supercomputers, workstations, or servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a physical computer processor, microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory might be used for storing information and instructions to be executed by processor 404. Main memory 408 might also be used for storing temporary variables or other intermediate information during execution of instructions to be executed by processor 404. Computing component 400 might likewise include a read-only memory ("ROM") or other static storage device coupled to bus 402 for storing static information and instructions for processor 404.

The computing component 400 might also include one or more various forms of information storage device 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, non-transient electronic storage, a hard disk, a floppy disk, magnetic tape, cartridge, optical disk, a CD or DVD, or other fixed or removable medium that is read by, written to, or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 424 might typically be carried on signals, which can be electronic, electromagnetic (which includes optical), or other signals capable of being exchanged by a given communications interface 424. These signals might be provided to communications interface 424 via channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
    detecting a first status of a head-mounted device with one or more physical computer processors;
    determining that a first time interval has elapsed since detecting the first status based on a timer;
    determining a second time interval dynamically based on one or more criteria;
    in response to determining the first time interval has elapsed, disabling a Wi-Fi component of the head-mounted device for the second time interval with the one or more physical computer processors;
    during the second time interval, queueing a set of requests associated with the head-mounted device;
    determining a subset of requests from the set of requests to be processed during a third time interval, wherein a processing time associated with the subset of requests satisfies the third time interval;
    determining that the second time interval has elapsed based on the timer;
    in response to determining the second time interval has elapsed, activating the Wi-Fi component for the third time interval with the one or more physical computer processors; and
    during the third time interval, processing the subset of requests.

2. The computer-implemented method of claim 1, wherein the first status comprises one or more of removal of the head-mounted device, a turned off display of the head-mounted device, or receipt of a first set of user input.

3. The computer-implemented method of claim 2, wherein the first set of user input comprises one or more of a user request to put the head-mounted device to sleep, a user request to exit the interactive content, or a user request to turn off the display.

4. The computer-implemented method of claim 1, wherein the first time interval is between ten minutes and four hours.

5. The computer-implemented method of claim 1, wherein the second time interval is between thirty minutes and twenty-four hours.

6. The computer-implemented method of claim 1, wherein the third time interval comprises a dynamic range from one minute to one hour.

7. The computer-implemented method of claim 1, further comprising, during the second time interval, activating the Wi-Fi component when a second status of the head-mounted device is detected with the one or more physical computer processors.

8. The computer-implemented method of claim 7, wherein the second status comprises receiving a signal from a user device.

9. The computer-implemented method of claim 8, wherein the signal from the user device is a Bluetooth packet requesting access to the Wi-Fi component for one or more activities, wherein the one or more activities comprises one or more of a remote installation, a remote wipe, an over-the-air update, or an operating system update.

10. The computer-implemented method of claim 9, wherein the Wi-Fi component is activated for a duration of the one or more activities, such that the one or more activities are completed.

11. The computer-implemented method of claim 9, wherein the Wi-Fi component is activated for the one or more activities and is inaccessible for other requests.

12. The computer-implemented method of claim 1, further comprising:
  activating the Wi-Fi component when a third status of the head-mounted device is detected with the one or more physical computer processors; and
  repeating the detecting, the disabling, and the activating with the one or more physical computer processors.

13. The computer-implemented method of claim 12, wherein the third status comprises one or more of charging the head-mounted device or activating the head-mounted device.

14. The computer-implemented method of claim 1, further comprising:
  during the third time interval, obtaining one or more requests corresponding to the Wi-Fi component from a server; and
  processing the one or more requests with the one or more physical computer processors.

15. A computer-implemented method comprising:
  detecting a first status of a head-mounted device with one or more physical computer processors;
  determining that a first time interval has elapsed since detecting the first status based on a timer;
  determining a second time interval dynamically based on one or more criteria;
  in response to determining the first time interval has elapsed, disabling a component of the head-mounted device for the second time interval with the one or more physical computer processors;
  during the second time interval, queueing a set of requests associated with the head-mounted device;
  determining a subset of requests from the set of requests to be processed during a third time interval, wherein a processing time associated with the subset of requests satisfies the third time interval;
  determining that the second time interval has elapsed based on the timer;
  in response to determining the second time interval has elapsed, activating the component for the third time interval with the one or more physical computer processors; and
  during the third time interval, processing the subset of requests.

16. The computer-implemented method of claim 15, wherein the component comprises one or more of a Wi-Fi component, a RFID component, a Zigbee component, a 2G component, a 3G component, a 4G component, a 5G component, a gyroscope, an accelerometer, a magnetometer, an IR sensor, an inertial sensor, an image sensor, a charge-coupled-device array, a camera, a location sensor, a microphone, a speaker, a display, an LED, or an emitter.

17. The computer-implemented method of claim 15, further comprising, activating the component when a second status of the head-mounted device is detected with the one or more physical computer processors.

18. A system comprising:
  one or more physical computer processors; and
  a memory storing instructions that, when executed by the one or more physical computer processors, cause the system to perform:
    detecting a first status of a head-mounted device;
    determining that a first time interval has elapsed since detecting the first status based on a timer;
    determining a second time interval dynamically based on one or more criteria;
    in response to determining the first time interval has elapsed, disabling a component of the head-mounted device for the second time interval;
    during the second time interval, queueing a set of requests associated with the head-mounted device;
    determining a subset of requests from the set of requests to be processed during a third time interval, wherein a processing time associated with the subset of requests satisfies the third time interval;
  determining that the second time interval has elapsed based on the timer;
  in response to determining the second time interval has elapsed, activating the component for the third time interval; and
  during the third time interval, processing the subset of requests.

19. The system of claim 18, wherein the component comprises one or more of a Wi-Fi component, a RFID component, a Zigbee component, a 2G component, a 3G component, a 4G component, a 5G component, a gyroscope, an accelerometer, a magnetometer, an IR sensor, an inertial sensor, an image sensor, a charge-coupled-device array, a camera, a location sensor, a microphone, a speaker, a display, an LED, or an emitter.

20. The system of claim 18, wherein the instructions, when executed by the one or more physical computer processors, further cause the system to perform activating the component when a second status of the head-mounted device is detected.

* * * * *